Oct. 7, 1958  F. A. McCORMICK  2,855,009
PARTITION STRIP FEEDING AND CUTTING MECHANISM
Filed May 17, 1956  5 Sheets-Sheet 1
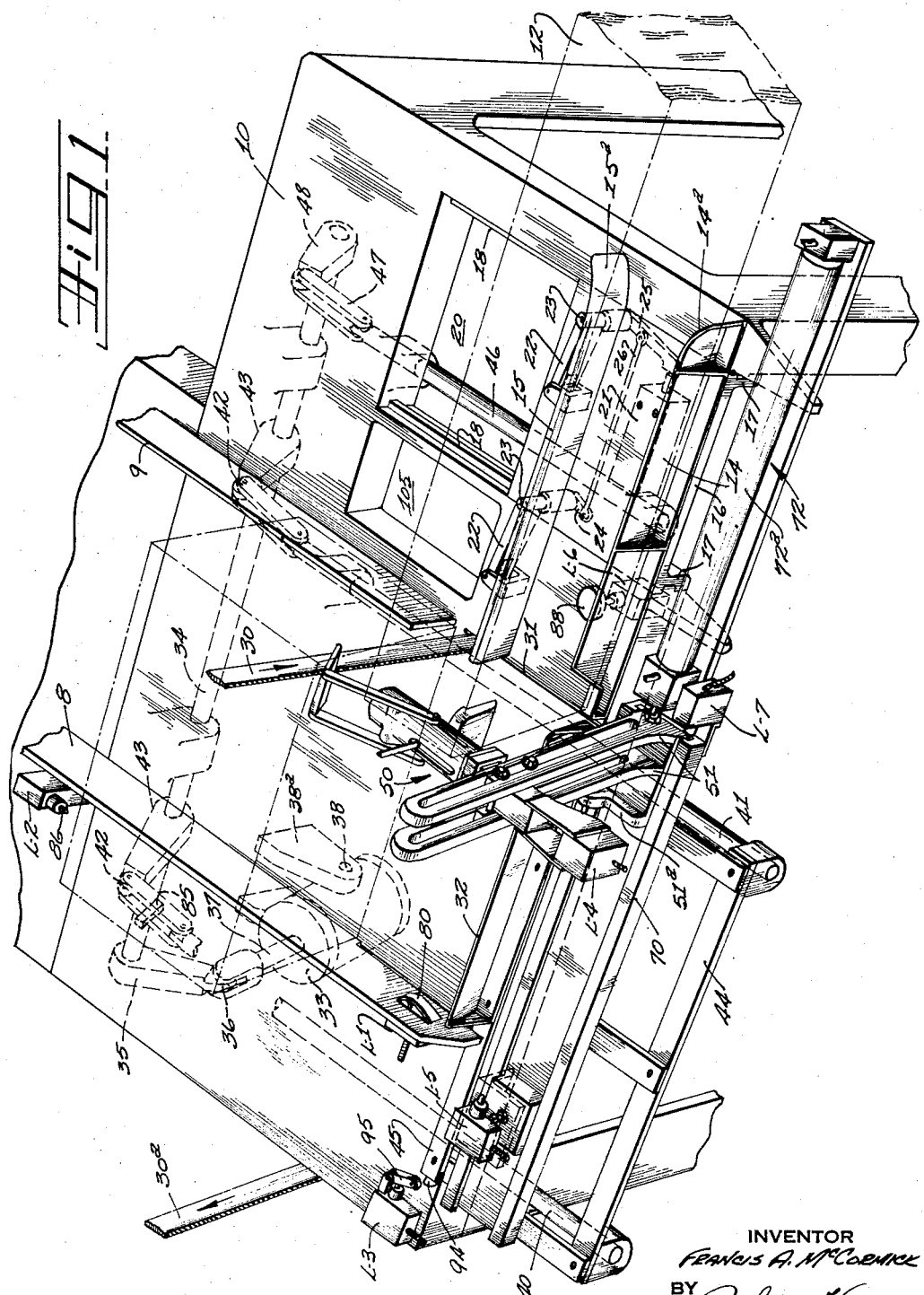
INVENTOR
FRANCIS A. McCORMICK
BY Rule & Hoge.
ATTORNEYS

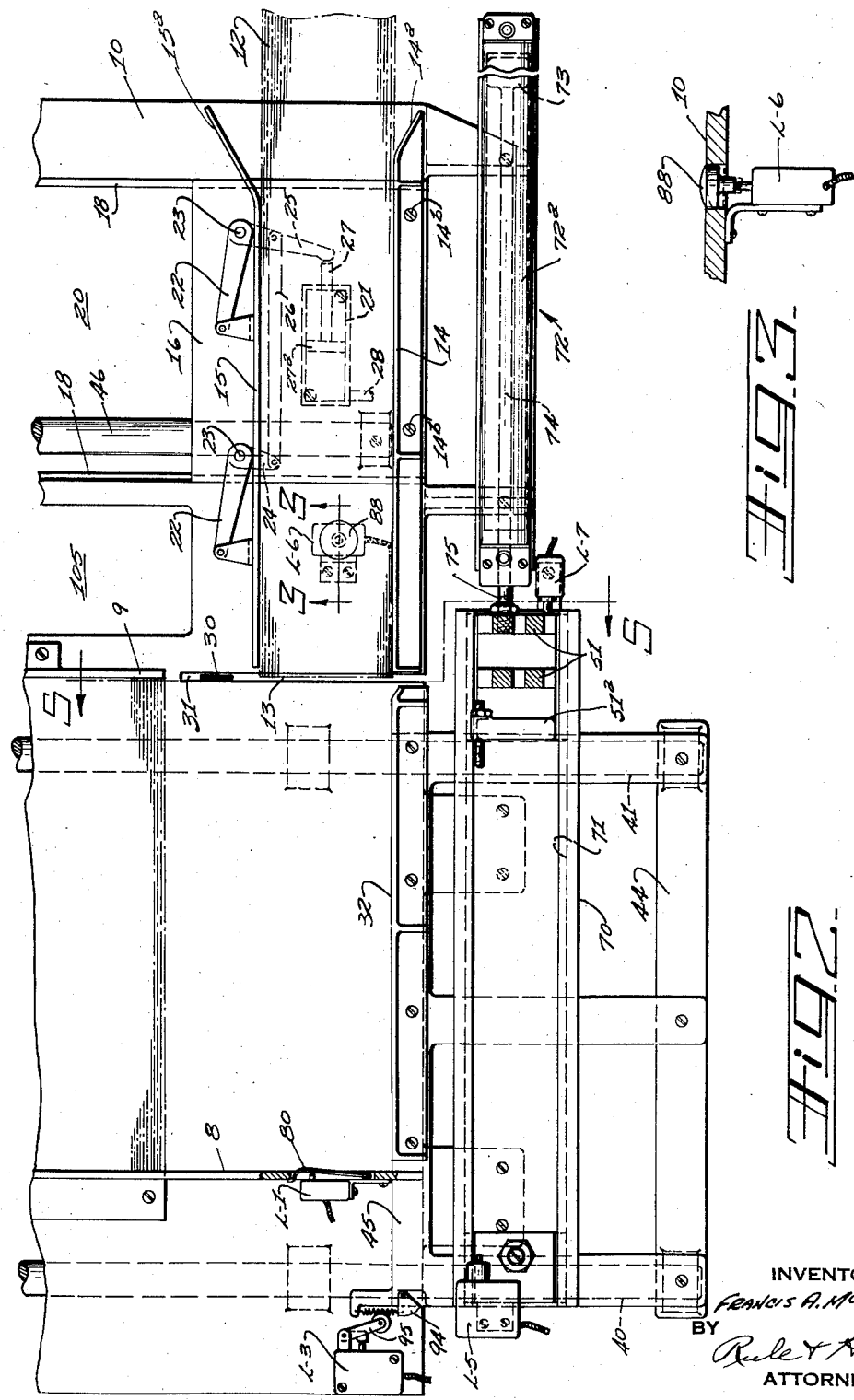

Oct. 7, 1958         F. A. McCORMICK         2,855,009

PARTITION STRIP FEEDING AND CUTTING MECHANISM

Filed May 17, 1956         5 Sheets-Sheet 3

INVENTOR
Francis A. McCormick
BY Rule & Hope
ATTORNEYS

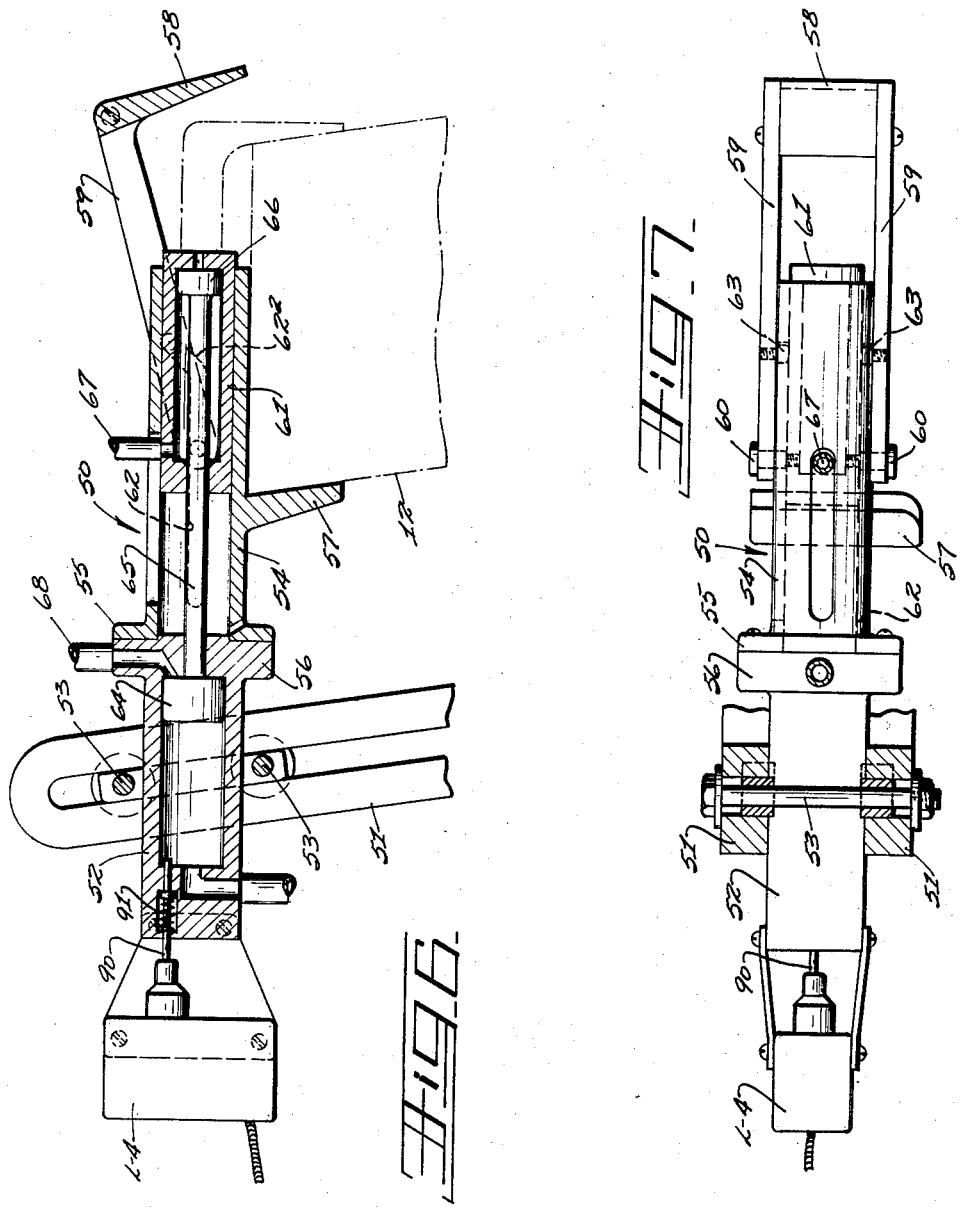

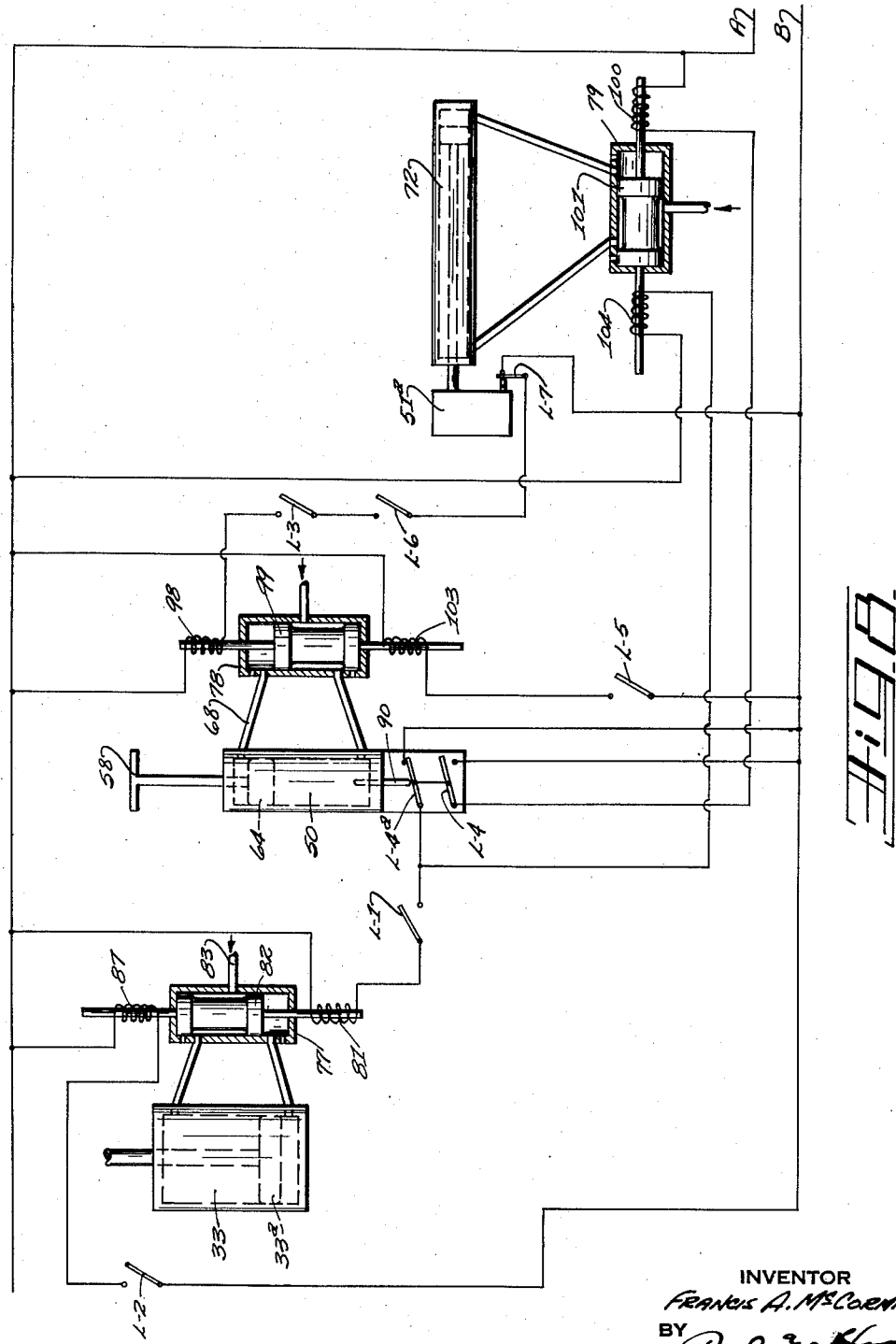

United States Patent Office 2,855,009
Patented Oct. 7, 1958

2,855,009

PARTITION STRIP FEEDING AND CUTTING MECHANISM

Francis A. McCormick, Toledo, Ohio, assignor to Owens-Illinois Glass Company, a corporation of Ohio Application May 17, 1956, Serial No. 585,518

17 Claims. (Cl. 143—53)

My invention relates to mechanism by which strips of sheet material such as paperboard and similar material are cut into shorter lengths. The stock to be cut comprises strips arranged in groups or bundles. Each bundle of strips is cut into shorter lengths, herein referred to as blanks, by a band saw. The stock is fed forward lengthwise, step by step, and after each step movement is moved transversely through the path of the band saw. Prior to my invention it has been the practice to feed the stock into the partition saw manually which is a hazardous and time-consuming operation. An object of the present invention is to provide an automatic apparatus for feeding the stock to the partition saw mechanically and automatically, thereby eliminating such hazard and freeing the operator from the time consuming hand operation.

The invention in the preferred form herein illustrated is used for cutting strip material into blanks which may serve as partition strips for use in cartons or other containers. In the particular form herein shown the invention provides a table on which the operator places a bundle of strips which are to be cut. The bundle is moved forward lengthwise between a pair of guide bars or plates to a stop position. These guide plates apply a yielding pressure to the stock for holding the strips together. The bundle of strips is then moved by pushers transversely forward across the path of the band saw which severs a group of blanks from the forward end of the stock. The pushers are then retracted carrying with them the stock from which the blanks have been severed. A clamping device then operates automatically to grip the forward end portion of the remaining stock. The clamping device is then moved forward in the direction lengthwise of the stock, bringing the latter into position for the next succeeding cut. At the completion of this forward movement the clamp is automatically released and returned to a position for the next succeeding clamping operation. The cycle of operations is repeated until the entire bundle has been severed into blanks of the desired length except a small end portion or trim remaining after the final cut. This trim is dropped through an opening in the table. The lengthwise and transverse movements of the stock are effected by separate air motors, and the clamping device is also operated by an air motor. These air motors are controlled by electromagnetic valves, which in turn are controlled by limit switches.

Referring to the accompanying drawings:

Fig. 1 is a perspective view of the apparatus;

Fig. 2 is a part sectional plan view of the same;

Fig. 3 is a detailed section at the line 3—3 on Fig. 2, showing a push button switch operated by the weight of the stock;

Fig. 6 is a sectional view of the clamping device shown in Fig. 5;

Fig. 7 is a plan view of the same, the support on which the clamp is mounted being shown in cross section; and Fig. 8 is a diagram of the air motors and the electrical control system.

Figure 4:
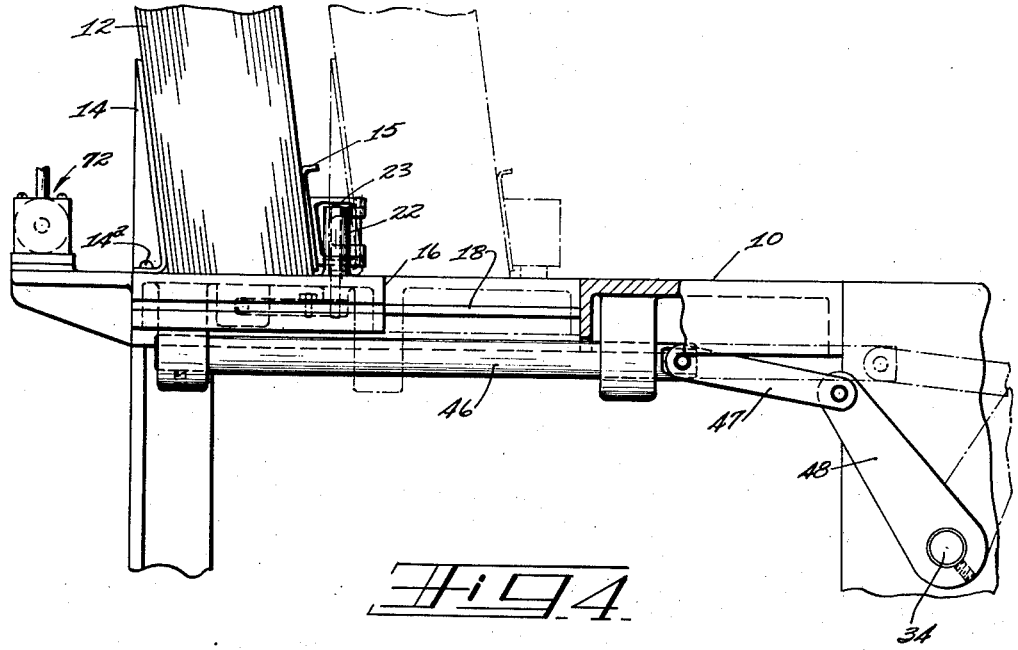
Fig. 4 is an elevational view with parts broken away and parts in section, showing means for clamping a bundle of strips and holding them in position.

Referring to Figs. 1 and 2, a table 10 provides a support for the operating parts. The stock which is to be cut into blanks comprises comparatively long narrow strips of the sheet material, the strips being fed into the machine in the form of groups or bundles 12. Each bundle 12 consists of a multiplicity of individual strips which are juxtaposed to form a rectangular or approximately rectangular body or sheaf, the forward ends 13 of the strips being in the same vertical plane.

The stock is fed lengthwise into the machine between parallel guides in the form of bars or plates 14 and 15 positioned over the table. The guide 14 is connected by screws 14b to a plate 16 the upper surface of which is flush with the surface of table 10. Shoes 17 formed on the under side of the plate 16 are grooved to run on guide rails 18 attached to the table 10. The table is formed with an opening 20 within which the plate 16 moves back and forth.

The plate 15 is mounted for movement toward and from the plate 14 and is actuated by an air spring comprising a cylinder 21 for applying a yielding pressure to the stock 12 for holding the strips together as hereinafter described. Operating connections between the air spring 21 and the plate 15 include parallel rock arms 22 fixed to rock shaft 23 which are pivotally connected to the plate 16. Rock arms 24 and 25 beneath the slide plate 16 are attached to the rock shafts 23 and connected by a link 26. The rock arm 25 is extended into the path of the piston rod 27 of the air cylinder 21. Air under pressure supplied through a pipe 28 to the cylinder 21 maintains a constant pressure on the piston 27a. This pneumatic pressure transmitted through the linkage just described applies a yielding pressure of the plate 15 against the stock 12. This pressure is sufficient to hold the strips together in their position on edge without interfering with the forward movement of the stock between the guides 14 and 15. The plate 16 together with the guide plates or rails 14 and 15 provides a carrier on which the bundle 12 is supported while being fed forward in the direction of its length and by which the stock is carried transversely as it is fed into the band saw. The ends 14a and 15a of the guide rails are flared to guide the stock on to the carrier.

The stock 12 is cut into shorter lengths or blanks by a band saw 30 driven continuously and extending vertically downward through a slot 31 in the table. The upwardly traveling reach 30a of the band saw is in a position beyond the table 10. A pusher bar 32 is mounted in alignment with the guide bar 14. The adjacent ends of the bars 14 and 32 are spaced apart at the vertical plane of the band saw. The bars 14 and 32 serve as pushers and operate as a unit for moving the stock transversely of its length for feeding it to the band saw. The means for operating these pushers comprises an air-operated cylinder 33 beneath the table. Operating connections between the motor 33 and the pushers include a rock shaft 34 journalled beneath the table and extending parallel with the pushers 14 and 32. A rock arm 35 keyed to the shaft 34 has a pivotal connection 36 with the piston rod 37. The cylinder 33 has a pivotal connection 38 with brackets 38a by which it is supported. Operating connections between the shaft 34 and the pusher 32 include a pair of rods 40 and 41 connected by links 42 to rock arms 43 keyed to the shaft 34. The rods 40 and 41 are connected to the pusher bar 32 by a frame including parallel bars 44 and 45, the latter attached directly to the pusher bar 32. The pusher bar 14 is operatively connected to the rock shaft 34 by a rod 46 parallel with the rods 40 and 41, the rod 46 being connected through a link 47 and rock arm 48 to the rock shaft 34. It will be seen that with the connections above described the motor 33 will reciprocate the pusher bars 14 and 32 as a unit in a direction transverse to their length.

Figure 5:
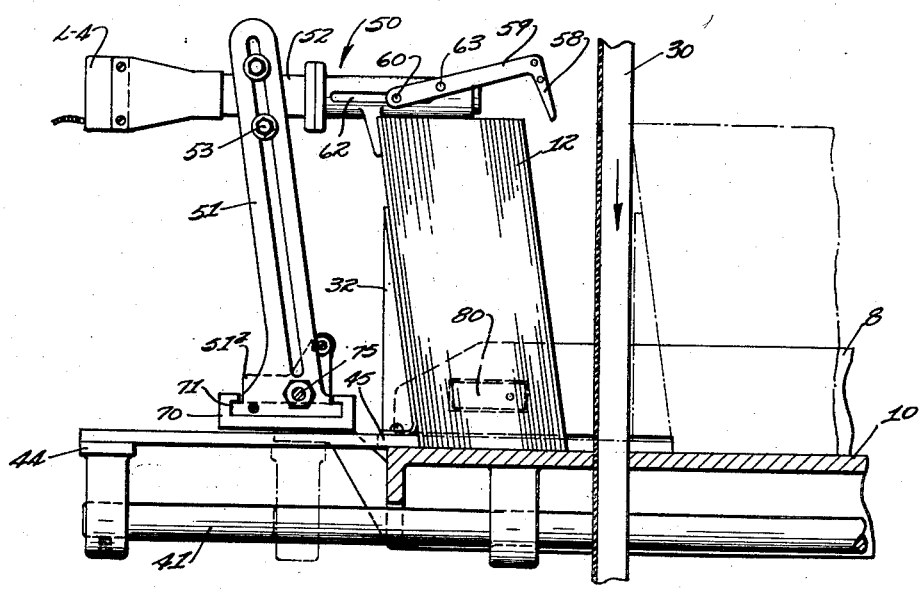
Fig. 5 is a part sectional elevational view showing the clamping device by which the stock is gripped and carried forward.

The clamping device for gripping the stock and drawing it forward lengthwise is shown in Figs. 1 and 5 to 7. This mechanism 50 is mounted in a pair of parallel standards or ears 51 attached to and extending upwardly from a carriage 51ª operated as hereinafter described. A cylinder 52 poistioned between the standards 51 is adjustable up and down therein and held in adjusted position by bolts 53. A barrel 54 or cylinder is formed at one end with a flange 55 by which it is attached to the head 56 of the cylinder 52. These cylinders 52 and 54 extend horizontally and in line. The cylinder 54 is formed with a depending jaw 57 which forms one of the gripping jaws for gripping the stock 12. The other gripping jaw 58 is mounted at the forward end of a pair of arms 59. The arms 59 are pivotally connected by pivot bolts 60 (Fig. 7) to a cylinder 61 which is mounted for lengthwise movement within the cylindrical case 54. The pivot bolts or pins 60 extend through slots 62 in the wall of the cylinder 54. The slots 62 are horizontal throughout the greater portion of their length. The forward end portions 62ª (Fig. 6) of these slots are forwardly and upwardly inclined. The arms 59 have attached thereto guide pins 63 which extend into the slots 62. When the gripping jaw 58 is in its forward position as shown in Figs. 5 and 6 the arms 59 are forwardly and upwardly inclined, with the pins 63 at the forward ends of the guiding slots 62. When the cylinder 61 is retracted the pins 63 moving downward through the inclined slots 62ª swing the gripping jaw 58 downward over the stock 12, the continued movement of the cylinder 61 then moving the gripping jaw horizontally into clamping position.

A piston 64 in the cylinder 52 is connected to one end of a piston rod 65 to the other end of which is connected a piston 66 in the cylinder 61. Air under pressure is supplied to the cylinder 61 through a pipe 67, maintaining a continuous forward pressure on the piston 66. Air pressure supplied through a pipe 68 to the cylinder 52 behind the piston 64, moves the latter to the left. The cylinder 61 is thus moved lengthwise within the cylinder 54 for operating the clamping jaw 58. The air under pressure within the cylinder 61 serves as a medium through which a constant pressure is transmitted and applied by gripping jaw 58 to the stock 12. This pressure is the same for any thickness of the sheaf or bundle 12.

The carriage 51ª on which the clamping device 50 is carried, is mounted to travel lengthwise of a plate 70 formed with guideways 71 (Figs. 2 and 5). The carriage is driven by a piston motor 72 which comprises a cylinder 72ª, a piston 73 and a piston rod 74. The piston rod has a screw-threaded end portion 75 (Fig. 2) by which it is attached to the carriage 51ª.

The strips forming the bundle 12 are held in a rearwardly inclined position as shown in Figs. 4 and 5 so that they will be fed gradually into the vertical cutter blade 30. The surfaces of the holding plates 14 and 15 and of the gripper jaws which contact the bundle are inclined for this purpose.

Each of the air motors is operated under the control of an electromagnetic valve. As shown in Fig. 8 these include the valve 77 controlling the pusher cylinder 33, a valve 78 controlling the clamping cylinder 50 and a valve 79 for the carriage cylinder 72. The valves are operated under the control of limit switches in circuit with the electromagnets. Electric current is supplied through the mains A and B.

The operation of cutting a bundle 12 into shorter lengths or blanks is initiated by moving the bundle lengthwise into the machine either manually or automatically, thereby bringing the forward end of the stock into engagement with a gauge bar or rail 8 which is mounted on the table and extends forwardly transversely of the pusher 32. A limit switch L1, Figs. 1 and 8, mounted on the gauge rail 8, is closed by a switch operating contact member 80 when the forward end of the stock 12 reaches the gauge 8. Closing of the switch L1 causes the pusher 32, 14 to move forward, as presently described, thereby feeding the stock into the saw 30 and severing a length of the stock into blanks which move forward between the gauge bar 8 and a parallel gauge bar 9, the latter being substantially in the vertical plane of the saw and extending rearwardly therefrom.

When the limit switch L1 is closed it completes a circuit for the valve solenoid 81 (Fig. 8) thereby shifting the valve piston 82 of the valve 77. This connects the air pressure line 83 to the lower end of the pusher cylinder. The piston 33ª is thereby moved upward and rocks the shaft 34, moving the pushers 14, 32 forward, feeding the work into the saw 30 and severing a group of blanks at the vertical plane of the saw. The forward movement of the pusher 32 carries the stock 12 beyond the limit switch L1, permitting it to open. As the pusher 32 completes its forward stroke, a lug 85 on the link 42 is brought into contact with a switch operating member 86 of a limit switch L2 (Figs. 1 and 8), thereby closing the switch and completing a circuit for the solenoid 87 of the valve 77. The valve is thus returned to the position shown in Fig. 8, so that the motor 33 returns the pushers 32, 14.

A limit switch L6, Figs. 1, 2 and 3, is mounted on the under side of the table 10 and is operated by a contact button 88 which protrudes upwardly through an opening in the table. The button is lowered by the weight of the stock 12 as the latter is fed forward over the table and thereby closes the switch L6 and holds it closed until the stock 12 has cleared the button during its final forward lengthwise movement preparatory to the final cut.

Limit switches L4 and L4ª, connected to operate as a unit, are operated by a rod 90 (Figs. 6, 7 and 8) mounted in the head of the cylinder 52. The rod projects into the cylinder in position to be operated by the piston 64 when the latter is moved to the left for operating the clamp. A coil compression spring 91 mounted on the rod 90 applies pressure to counteract the pneumatic pressure within the cylinder and hold the rod in its retracted position. When the contact rod 90 is retracted as shown the switch L4ª is closed and the switch L4 is opened as shown in Fig. 8.

A limit switch L3 as shown in Figs. 1 and 2 is operated by a dog 94 mounted for movement with the pusher 32. When the pusher 32 is retracted after the cutter has severed a group of blanks, the dog 94 operates through an arm 95 to close the limit switch L3. When the pusher moves forward the dog 94 swings idly on its pivot without operating the switch.

As shown in Fig. 8 the limit switches L3 and L6 above described and the limit switch L7 are all connected in series. The switch L7 (Figs. 1 and 2) has a stationary mounting in position to be held closed by the carriage 51ª when the latter is in its retracted position and automatically opens as the carriage starts forward for drawing the stock 12.

*Operation*

A resume of the operation is as follows: While the machine is empty the various controls are in the positions indicated in the diagram, Fig. 8. When a bundle 12 is fed into the machine it depresses the button 88 thereby closing the switch L6. As the forward end of the bundle reaches the gauge bar 8 the limit switch L1 is closed. This makes a circuit through the solenoid 81, shifts the valve piston 82 and causes the pusher cylinder 33 to move the pushers 32, 14 forward, thereby severing the first group of blanks from the stock 12. At the end of the forward stroke the limit switch L2 is closed, the solenoid 87 energized, and the pusher cylinder 33 reversed. As the pusher completes its return movement it closes the limit switch L3. This makes a circuit for a solenoid 98 of the clamping cylinder valve 78 so that the valve piston 99 is shifted. The air pressure supplied through the pipe 68 is applied behind the piston 64, thereby operating the clamping cylinder so that the gripper jaws 57, 58 grip the forward end of the stock remaining after the first cutting operation. The piston 64 during its final forward movement, after operating the clamping cylinder, operates through the rod 90 to open the limit switch L4ᵃ and closes the limit switch L4. The closing of the switch L4 makes a circuit for the solenoid 100 of the carriage cylinder valve 79. The solenoid shifts the valve piston 101 so that the carriage cylinder operates to move the carriage 51ᵃ and clamp 50 forwardly, bringing the remaining forward end of the stock up the gauge 8. This forward movement of the carriage closes a limit switch L5. This makes a circuit for a solenoid 103 of the valve 78 so that the valve piston 99 is returned to the position shown, thereby reversing the clamping cylinder and releasing the clamp 50. This reversal of the clamping cylinder closes the limit switch L4ᵃ and opens the limit switch L4. The closing of the limit switch L4ᵃ makes a circuit for a solenoid 104 of the valve 79 so that the valve piston 101 is reversed, that is, returned to the position shown, thereby causing the carriage cylinder to return the carriage and the open clamp.

It will be noted that the final forward movement of the carriage 51ᵃ which closes the limit switch L5 as above described, also causes the switch L1 to be closed by the stock. As a result the motor 33 moves the pusher 32 forward concurrently with the return movement of the carriage 51ᵃ. The motor 33 however cannot operate before the clamp piston 64 moves in a direction for releasing the clamp, thereby permitting the limit switch L4ᵃ to close.

The cycle of operations is repeated until the end of the bundle 12 has passed beyond the contact button 88 and opens the switch L6. The remaining trim or waste stock after the final cutting operation drops through an opening 105 in the floor of the table 10.

Modifications may be resorted to within the spirit and scope of my invention as defined in the appended claims.

I claim:

1. Apparatus for feeding and cutting strips of sheet material comprising a table, means for guiding a bundle of the strips lengthwise over the table in a predetermined path, a pusher mounted over the table and extending lengthwise of said path at one side thereof, means for moving the bundle lengthwise step by step including a clamp positioned over the path of the bundle, means for operating said clamp and gripping the forward end portion of the bundle, a carriage on which the clamp is mounted, means for moving the carriage forward and thereby drawing the bundle forward, a gauge in the path of the forwardly moving bundle, automatic means for releasing the clamp when the bundle reaches said gauge, means for returning the clamp, means for moving the bundle transversely of its length, and a cutter in the path of the transverse movement in position to cut said strips into shorter lengths.

2. Apparatus for feeding a bundle of strips of sheet material and severing the bundle into shorter lengths, said apparatus comprising a support over which the bundle is moved in the direction of its length, a clamp, a carriage on which the clamp is mounted, said carriage mounted for forward and return movement in said direction, a clamp operating motor, means providing operating connections between the clamp and said motor, a carriage motor, means providing connection between the carriage motor and said carriage for operating the latter, a pusher extending along the path of the said bundle at one side thereof, and automatic control means for effecting and controlling the operations of said motors, said control means operative to cause the clamping motor to operate the clamp and grip the forward end portion of the bundle and thereafter cause the carriage motor to move said carriage forwardly and thereby draw the bundle forwardly, a gauge limiting the forward movement of the bundle, said control means operable to cause the pusher motor to operate said pusher and move the bundle transversely of its length, and a cutter in position to sever the bundle during said transverse movement thereof.

3. A machine for cutting strips of sheet material into shorter lengths, comprising a carrier including parallel guide plates and a bottom supporting plate, means for feeding a bundle of strips forwardly over the bottom plate of the carrier and between the guide plates, a stop gauge to arrest the bundle in a predetermined position, a carrier motor, means forming operating connections between the motor and the carrier, a limit switch in position to be operated by the said bundle as it reaches the stop gauge, electroresponsive means controlled by said limit switch for effecting the operation of said motor and thereby moving the carrier transversely, and a cutter positioned and operative to sever lengths of the strip material from said bundle during said transverse movement of the carrier.

4. The machine defined in claim 3, one of said guide plates being mounted for movement toward and from the other guide plate, and means for applying a yielding pressure of said movable guide plate against the bundle supported on the carrier, and thereby holding the strips forming said bundle in position and on edge.

5. The machine defined in claim 4, said means for applying pressure to the movable guide plate comprising an air spring and means operated thereby for transmitting pressure to the movable guide plate, said last mentioned means including parallel links and rock arms connected to said links.

6. The machine defined in claim 5, said machine including a pusher extending in the direction lengthwise of the said bundle and positioned in advance of the said carrier to gauge a forward end portion of the bundle as it moves forward beyond the carrier, and means providing operating connections between said motor and the pusher for moving the latter as a unit with the carrier.

7. The machine defined in claim 3 including a second limit switch, means operated by the said motor for closing said second limit switch as the carrier completes its transverse forward movement, and means controlled by said second limit switch for reversing the motor and returning the carrier and pusher.

8. The machine defined in claim 7 including a gripper for gripping the forward end portion of the bundle after the return movement of the carrier, a clamping motor for operating said gripper, a carriage on which the clamping motor and gripper are mounted, said carriage being mounted for movement in a direction lengthwise of the carrier and bundle thereon for moving the bundle lengthwise.

9. The machine defined in claim 8, said machine comprising electroresponsive means controlling the operation of the clamping motor, electroresponsive means controlling the operation of the carrier motor, and limit switches for initiating the operation of the several electroresponsive means.

10. The machine defined in claim 3, said means for moving the carrier transversely including a pusher extending in the direction in which said parallel guide plates extend and positioned in advance of said parallel guide plates in said direction to engage a forward end portion of the bundle as it moves forward beyond said parallel guide plates, and means providing operating connections between said motor and the pusher for moving the latter as a unit with the carrier.

11. A machine for cutting a bundle of strips of sheet material into shorter lengths, said machine comprising a gripper for gripping the bundle, a piston motor for operating the gripper including a cylinder, reciprocating piston and piston rod, the gripper comprising a clamping jaw having a fixed connection with the cylinder, a movable clamping jaw mounted for movement relative to the cylinder to and from a clamping position, an arm to which said movable jaw is attached, a pivot pin connected to said arm, means providing operating connections between said pivot pin and the piston for moving the said arm and movable clamping jaw back and forth with the motor piston, a cam in fixed position relative to the said cylinder and having a guiding surface portion extending in a direction lengthwise of the cylinder and a surface portion inclined to said direction, and a cam follower pin carried by said arm and running on said guiding surface, said guiding surface being positioned and shaped to swing said arm and movable jaw to and from said clamping position as the piston is reciprocated, means for moving the gripper and its operating motor forward step-by-step in a direction lengthwise of the bundle while the latter is gripped by said gripper, and means for severing a length from the bundle after each of said forward movements.

12. A machine comprising means for feeding a bundle of straight strips of sheet material forwardly lengthwise, step by step, means for feeding the bundle laterally, step by step, in alternation with said lengthwise movements, a cutter in position to sever lengths from the bundle during said lateral movements, a bundle gripper comprising gripping jaws relatively movable from an open to a gripping position, a carriage on which the gripper is mounted, the carriage being mounted for reciprocating movement in a direction lengthwise of the said bundle, automatic means for actuating the gripper and causing it to grip the forward end portion of the bundle, the said means for feeding the bundle forwardly comprising a motor for driving said carriage and thereby drawing the bundle in the direction of its length, automatic means for releasing the gripper as the bundle completes a forward movement, automatic means for returning the carriage and gripper while the gripper is in released position, and automatic means for maintaining the gripping jaws in said open position and holding them against relative movement to gripping position except while the carriage is in its retracted position.

13. A machine by which a bundle of straight strips of sheet material is fed intermittently forward in the direction of its length and alternately transversely and severed into shorter lengths during the transverse movements, said machine comprising a carrier including a bottom plate and parallel guide rails above said plate, said carrier forming a guideway through which a bundle of strips is fed lengthwise, one of said guide rails being mounted for bodily movement toward and from the other guide rail, means for applying a yielding pressure to the movable rail in a direction of hold it with a yielding pressure against the bundle and thereby hold the strips in their assembled position in the bundle, with the strips supported on edge on the bottom plate of the carrier, a support on which the carrier is mounted for reciprocating movement transversely of its length, a band saw having a downward traveling reach in a vertical plane adjacent to the forward end of the said carrier and perpendicular to the direction of travel of the bundle lengthwise, a pusher bar on the opposite side of said plane from the carrier and extending in alignment with one of said guide rails in position to engage the bundle when the latter is moved lengthwise through the carrier and beyond said plane, stop means to stop the bundle when it reaches a predetermined position during its forward movement in the direction of its length, and means operative when the bundle has reached said predetermined position for moving the carrier and pusher bar transversely and thereby feeding the bundle into the saw and severing the bundle into shorter lengths.

14. The machine defined in claim 13, said machine comprising a carriage, a clamping device mounted on the carriage, means for moving the carriage from a retracted position forwardly in a direction parallel with the pusher bar, said clamping device including gripping jaws relatively movable from an open position to a gripping position for gripping the bundle, said gripping jaws being positioned adjacent to said cutting plane when the carriage is in its retracted position, means for actuating the gripping jaws and gripping the bundle at its forward end while the carriage is in said retracted position, a carriage driving motor, and automatic means for effecting the operation of said motor thereby moving the carriage forward and causing the clamping device to draw the bundle forward in the direction of its length.

15. Apparatus for feeding and cutting strips of sheet material, comprising means for moving a bundle of the strips lengthwise step by step including a bundle clamping device mounted over the path of the bundle, means for operating said clamping device and thereby clamping the forward end portion of the bundle, means for moving the clamping device forward and thereby drawing the bundle forward through one step, a gauge in the path of the forwardly moving bundle, automatic means for releasing the clamping device when the bundle reaches said gauge, means for automatically returning the clamping device, automatic means for moving the bundle transversely of its length when the clamping device is released, and a cutter in the path of the transversely moving bundle in position to cut the strips into shorter lengths.

16. A machine for cutting a bundle of strips of sheet material into shorter lengths, said machine comprising means for supporting the bundle to extend in a predetermined direction and in a predetermined stop position, a gripper for gripping the bundle, means for mounting the gripper in position for gripping the forward end portion of the bundle while the bundle is in said stop position, a piston motor for operating the gripper including a cylinder, piston and piston rod, the cylinder with its piston rod being mounted to extend in a direction transverse to that of the bundle while the latter is in said stop position, the gripper comprising a clamping jaw having a fixed connection with the cylinder in position to engage one side of the said forward end portion of the bundle while the latter is in said stop position, a movable clamping jaw mounted for movement relative to the cylinder and transversely of the bundle to and from a clamping position in which the said end portion of the bundle is clamped between said jaws, means providing operating connections between the motor piston and the movable clamping jaw for moving the latter into and out of said clamping position when the motor is operated, means for intermittently moving the piston motor and gripper back and forth as a unit in a direction lengthwise of the bundle, means for operating the said motor and causing it to hold the clamping jaw in gripping engagement with said end portion of the bundle during the forward movements of the motor and gripper, means for releasing the jaws upon completion of each forward movement, thereby drawing the bundle forward step-by-step in the direction of its length, a cutter, and means operating in alternation with the forward movements of the bundle to effect a relative movement of the cutter and bundle in a direction transverse to the direction in which the bundle extends and thereby to sever lengths of said strips from the bundle after each forward movement of the bundle, said cutter being in position during a cutting operation to sever the bundle at a point between the gripper and the portion of the bundle from which the forward end portion is being severed.

17. A machine for cutting a bundle of strips of sheet material into shorter lengths, said machine comprising means for holding the bundle in a stop position with the bundle extended in a predetermined direction, a gripper for gripping the bundle, a piston motor for operating the gripper, said motor including a cylinder, piston and piston rod, a carriage on which the piston motor and gripper are mounted with the cylinder and piston extending transversely of said direction in which the bundle extends, the gripper comprising a clamping jaw having a fixed connection with the cylinder and a movable clamping jaw mounted for movement relative to the cylinder to and from a clamping position in which the forward end portion of the bundle is gripped by said jaws, an air cushioning means between the motor piston and the movable clamping jaw, means for transmitting a continuous and constant air pressure to said cushioning means and thereby providing a constant gripping pressure between the gripping jaws while the movable jaw is in the clamping position, means for periodically operating the piston motor for gripping the forward end portion of the bundle, means for moving the carriage and with it the piston motor and gripper forward in said direction in which the bundle extends while the forward end portion of the bundle is gripped and thereby moving the bundle forward in the direction of its length, and means for severing from the bundle after each said forward movement, the forward end portion of the bundle while it is gripped by said jaws, the said severing means being positioned relative to the gripper for severing the bundle between the gripper and the remaining portion of the bundle from which the said forward end portion of the bundle is severed.

References Cited in the file of this patent

UNITED STATES PATENTS

| | | |
|---|---|---|
| 155,479 | Weber | Sept. 29, 1874 |
| 254,741 | Walsh | Mar. 7, 1882 |
| 1,873,818 | Burns | Aug. 23, 1932 |
| 2,349,133 | Benton | May 16, 1944 |
| 2,530,880 | Hermann | Nov. 21, 1950 |
| 2,540,004 | McFall | Jan. 30, 1951 |
| 2,593,726 | Burge | Apr. 22, 1952 |
| 2,638,133 | Trapeur | May 12, 1953 |
| 2,678,070 | Davis | May 11, 1954 |
| 2,705,511 | Latta | Apr. 5, 1955 |

FOREIGN PATENTS

| | | |
|---|---|---|
| 524,503 | France | May 1921 |
| 882,492 | France | Mar. 1, 1943 |